US008056127B2

(12) United States Patent
Chancey et al.

(10) Patent No.: US 8,056,127 B2
(45) Date of Patent: Nov. 8, 2011

(54) ACCESSING PASSWORD PROTECTED DEVICES

(75) Inventors: Raphael P. Chancey, Leander, TX (US); Eduardo T. Kahan, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/930,693

(22) Filed: Oct. 31, 2007

(65) Prior Publication Data

US 2009/0113544 A1 Apr. 30, 2009

(51) Int. Cl.
*G06F 7/04* (2006.01)
*G06F 12/14* (2006.01)
*G06F 13/00* (2006.01)

(52) U.S. Cl. ...................................................... 726/19
(58) Field of Classification Search ...................... 726/19
See application file for complete search history.

(56) References Cited

U.S. PATENT DOCUMENTS

| 2001/0011947 A1* | 8/2001 | Jaber et al. ............... 340/568.1 |
| 2003/0208696 A1* | 11/2003 | Piwonka et al. ............ 713/202 |
| 2005/0138433 A1* | 6/2005 | Linetsky ..................... 713/202 |

OTHER PUBLICATIONS

A-FF Data Recovery, "HDD Unlock", http://www.hddunlock.com/, (2006).

Hdkiller, "Unlocking Seagate Hard Drives", Seagateunlock.com,(2006-2008),1-3.
"Internet Archive Wayback Machine", http://classic-web.archive.org/web/*/%20http://pwcrack.com/bios.shtml (Obtained from the Internet on May 6, 2011) 2002 , 1 page.
Password Crackers Inc, "Bios Password and Locked Hard Disk Recovery", http://pwcrack.com/bios.shtml (Obtained Jan. 29, 2008), 1-3.

* cited by examiner

*Primary Examiner* — Kambiz Zand
*Assistant Examiner* — Aubrey Wyszynski
(74) *Attorney, Agent, or Firm* — DeLizio Gilliam, PLLC

(57) ABSTRACT

Embodiments of the invention include a method that comprises receiving and storing a power-on password. Embodiments of the invention include a method that comprises receiving and storing a power-on password. In one embodiment, the method includes receiving a power-on password, wherein the receiving of the power-on password occurs during power-on operations of a computer. The method can also include storing the power-on password, wherein the storing includes saving the power-on password in memory. The method can also include loading an operating system to control the computer, wherein the loading occurs after the power-on operations. The method can also include detecting, after the loading, that a peripheral devices has been added to the computer and determining that an access password is needed to access the peripheral device. The method can also include transmitting the power-on password to the peripheral device and presenting a prompt requesting a secondary password; receiving the secondary password. The method can also include transmitting the secondary password to the peripheral device; and accessing the peripheral device.

16 Claims, 3 Drawing Sheets

ACCESSING PASSWORD PROTECTED DEVICES

FIELD OF INVENTION

Embodiments of the invention generally relate to the field of password protected peripheral devices, and more particularly to methods of accessing data on peripheral devices without having to reboot a computer.

BACKGROUND

Plug-and-play is a common feature of most of today's computer systems. Plug-and-play allows computer systems to automatically recognize peripheral devices. Thus, it eliminates the need to set switches, jumpers, and other configuration elements. Peripheral devices can include hard disk drives, video cameras, cellular phones, digital cameras, etc. Some peripheral devices can be password protected to shield internal data from theft or damage. As a result, some peripheral devices are not accessible when they are plugged-into a computer system. For example, even though plug-and-play features allow a computer system to recognize a peripheral device, the peripheral device may remain inaccessible until it receives a password.

SUMMARY

Embodiments of the invention include a method that comprises receiving and storing a power-on password. In one embodiment, the method includes receiving a power-on password, wherein the receiving of the power-on password occurs during power-on operations of a computer. The method can also include storing the power-on password, wherein the storing includes saving the power-on password in memory. The method can also include loading an operating system to control the computer, wherein the loading occurs after the power-on operations. The method can also include detecting, after the loading, that a peripheral device has been added to the computer and determining that an access password is needed to access the peripheral device. The method can also include transmitting the power-on password to the peripheral device and presenting a prompt requesting a secondary password. The method can also include receiving the secondary password, transmitting the secondary password to the peripheral device, and accessing the peripheral device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENTS

Computer users often want to plug-in password protected hard disks and other peripherals into their notebook computers after start-up. Some notebooks cannot provide passwords to hard disks after power-on operations are complete. However, some embodiments of the invention allow notebooks to provide passwords to hard disks after start-up, avoiding delays associated with shutting down and restarting. In some embodiments, the notebook first sends a power-on password stored in BIOS, and if that does not "unlock" the disk drive, it presents a user interface for receiving a password for the disk drive. In turn, the notebook can send the password to the disk drive.

While this introduction refers to notebooks and hard disk drives, some embodiments work with any suitable computer and peripheral device. These and other features are described in greater detail below.

The description that follows includes exemplary systems, methods, techniques, instruction sequences and computer program products that embody techniques of the present invention. However, it is understood that the described invention may be practiced without these specific details. For instance, although examples refer to the functionality of the BIOS in terms of components, BIOS extensions can be implemented in place of components. In other instances, well-known instruction instances, protocols, structures and techniques have not been shown in detail in order not to obfuscate the description.

Figure 1:
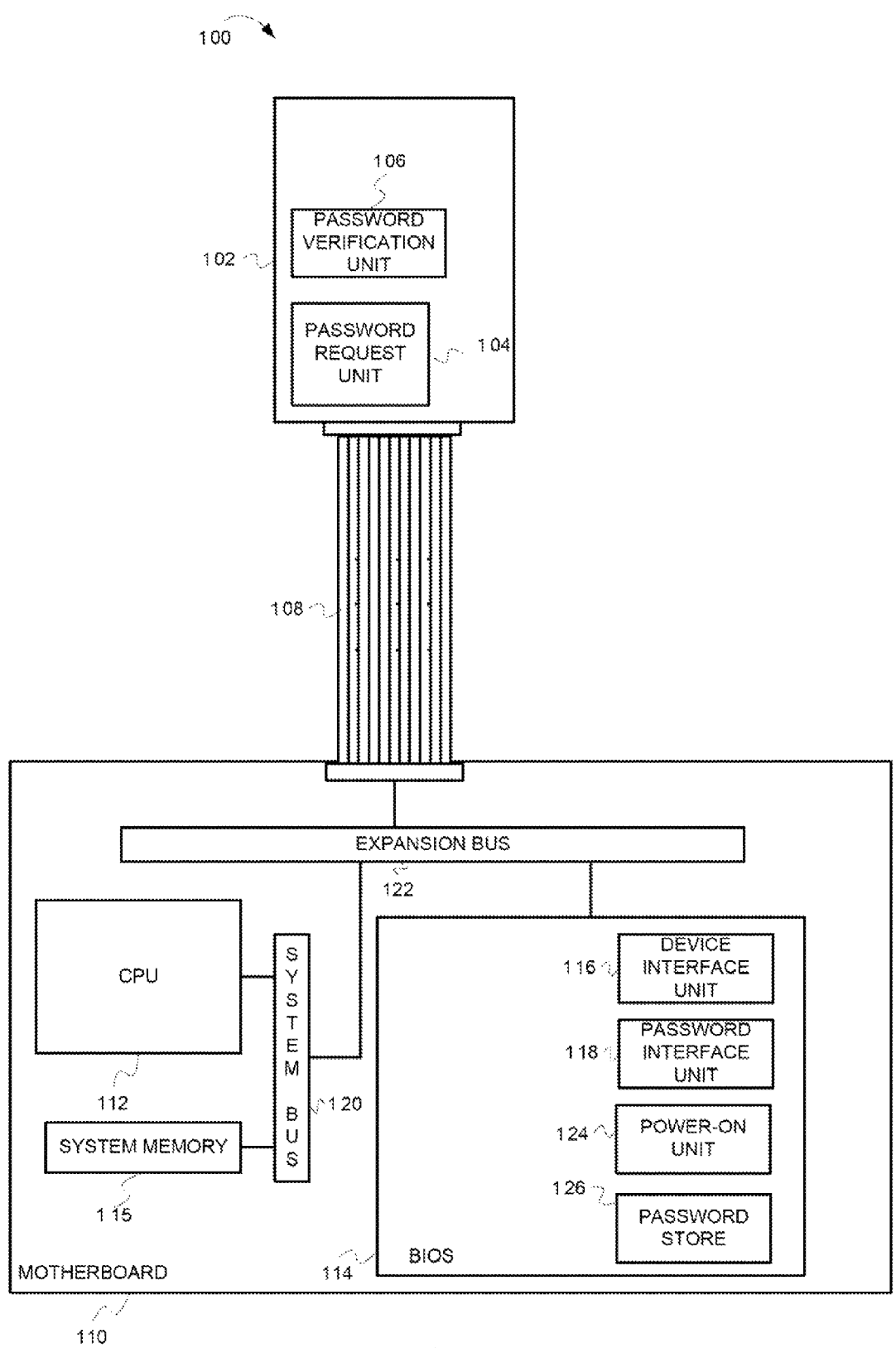
FIG. 1 illustrates a computer system 100 capable of automatically logging onto devices that require a password, according to some embodiments of the invention.

FIG. 1 illustrates a computer system 100 capable of automatically logging onto devices that require a password, according to some embodiments of the invention. The computer system 100 includes a peripheral device 102, a bus interface cable 108 (e.g., parallel ATA, IDE, USB, etc.), and a motherboard 110. The peripheral device 102 can include a variety of devices, such as external hard drives, storage devices, media devices, or any other suitable devices. In FIG. 1, the motherboard 110 includes a central processing unit (CPU) 112, a basic input output system (BIOS) 114, and system memory 115. As shown, the CPU 112 is connected to the system memory 115 via a system bus 120. The BIOS 114 includes a device interface unit 116, password unit 118, power-on unit 124, and password store 126. An expansion bus 122 connects the BIOS 114 to the peripheral device 102 and the system bus 120.

The BIOS' power-on unit 124 can handle the computer system's low level operations, such as a power-on self test and booting the operating system from an attached hardware device. Furthermore, it can establish an interface between the operating system and the computer hardware by providing a number of interrupt handlers and other components. For example, one of the interrupt handlers can be a keyboard interrupt handler that enables the CPU 112 to read keystrokes for a keyboard. BIOS 114 can also facilitate various complex functions such as hot swapping, power management, and thermal management. The BIOS 114 can be embodied in a semiconductor memory, such as PROM, EPROM, or flash memory. The BIOS 114 can store power-on passwords and oilier data in the password store 126.

BIOS' password unit 118 can present user interfaces for receiving passwords. For example, during power-on operations, the password unit 118 can present a user interface in which a user can enter a power-on password. The password unit 118 can also present password interfaces after BIOS completes power-on operations. BIOS' device interface unit 116 can receive password requests from the peripheral device 102 and it can transmit passwords to the peripheral device 102. The device interface unit 116 can receive the password requests daring power-on operations and after power-on operations are complete. The device interface unit 116 can respond to the password requests by transmitting passwords (e.g., passwords from the password store 126 and passwords received via a user interface) to the peripheral device 102.

The computer system 100 also includes a peripheral device 102 that requires a password before it allows other components (e.g., the CPU 112) to access it. For example, the peripheral device 102 can include a data storage device that requires a password before allowing access to its data. The peripheral device includes a password request unit 104 and password verification unit 106. The peripheral device 102 can be connected to the computer system 100 at power-on or it can be connected later (i.e., after BIOS 114 has completed power-on operations). In either case, the peripheral device's password request unit 104 can request access passwords from the motherboard 110. The peripheral device's password verification unit 106 can receive passwords from the motherboard 110 (e.g., during or after power-on operations) and verify that the passwords match a stored access password.

Although not shown in FIG. 1, the peripheral device 102 and the mother board 110 can include many other components, such as ports, I/O controllers, busses, audio & video devices, etc. Also, any component of the BIOS 114 can be implemented as a BIOS extension. Furthermore, any of the components described herein can include hardware, firmware, and/or machine-readable media including instructions for performing the operations described herein. Machine-readable media includes any mechanism that provides (i.e., stores and/or transmits) information in a form readable by a machine (e.g., a game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

System Operations

This section describes operations performed by some embodiments of the systems described above. In certain embodiments, the operations can be performed by executing instructions residing on machine-readable media (e.g., software), while in other embodiments, the operations can be performed by a combination of software, hardware, and/or other logic (e.g., firmware). In some embodiments, the operations can be performed in series, while in other embodiments, one or more of the operations can be performed in parallel. Moreover, some embodiments can perform less than all the operations shown in the Figures.

Figure 2:
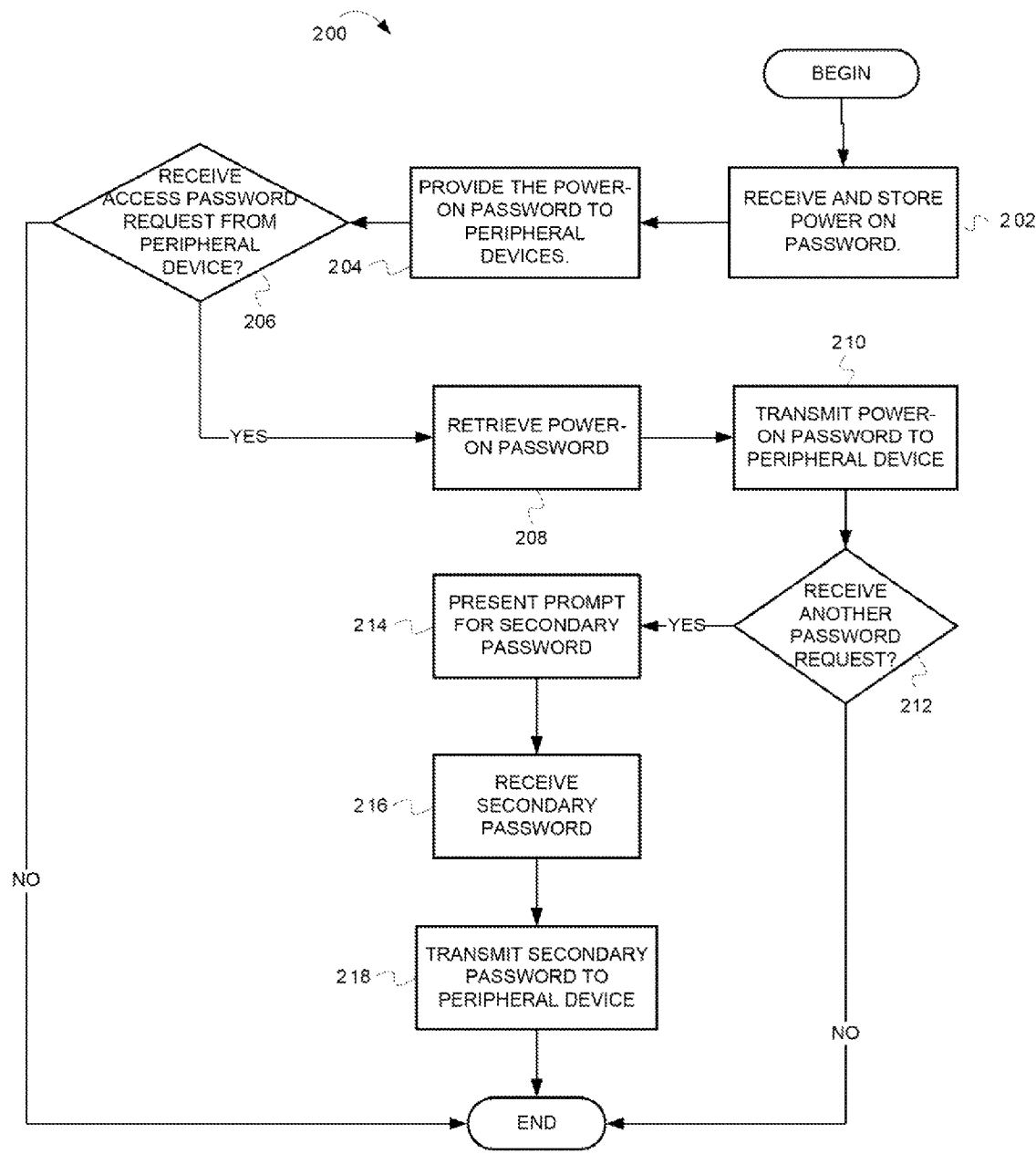
FIG. 2 is a flow diagram illustrating the operations of the BIOS 114, according to some embodiments of the invention.

FIG. 2 is a flow diagram illustrating the operations of the BIOS 114, according to some embodiments of the invention. The flow 200 will be described with reference to the computer system in FIG. 1. In FIG. 2, flow 200 begins at block 202.

At block 202, during power-on operations, the password unit 118 receives a password through a graphical user interface (GUI). When the computer system powers-on, the power-on unit 124 initializes several motherboard components such as a clock generator (not shown), PCI devices (not shown), the CPU 112, system memory 115, the primary graphics controller (not shown), etc. During the power-on operations, the password unit 118 presents a GUI for receiving a power-on password. After receiving the power-on password, the password unit 118 can authenticate a user by comparing the password to a power-on password stored in the password store 126. The flow continues at block 204.

At block 204, the device interface unit 116 provides the power-on password stored in the password store 126 to existing peripheral devices connected during the power on startup test (POST) phase. The flow continues at block 206.

At block 206, the BIOS 114 determines if a request for an access password has been received from the peripheral device 102. In some embodiments of the invention, a user can disconnect an existing peripheral device that was present during the POST phase and replace it with a new peripheral device (e.g., hard drive, digital device, storage device, etc.) that requires a password before allowing outside devices access to it or its internal data. For example, when the peripheral device 102 includes a hard disk drive, the drive can be password protected to prevent data theft. In some embodiments of the invention, the BIOS 114 can detect whether the peripheral device 102 is locked and requires a password without receiving a request. If the BIOS 114 determines that no request for an access password has been received, the flow ends. If the BIOS 114 determines that a request for an access password has been received, the flow continues at block 208.

At block 208, after detecting that a new peripheral device has been added, the device interface unit 116 retrieves the power-on password from the password store 126 or other location. The device interface unit 116 will later send the retrieved password to the peripheral device 102 in response to the request for an access password. The flow continues at block 210.

At block 210, the device interface unit 116 transmits the power-on password to the peripheral device 102. The peripheral device's password verification unit 106 will compare the power-on password to the required access password to determine whether it will grant access to the motherboard 110. The flow continues at block 212.

At block 212, the device interface unit 116 determines whether the peripheral device 102 has requested another password. The peripheral device 102 can make such a request when the power-on password (or previously entered secondary password) does not match the required access password. If the BIOS 114 determines that no additional password request has been made, the flow ends. If the BIOS 114 determines that a request for a password has been made, the flow continues at block 214.

At block 214, the password unit 118 presents a prompt for a secondary password to be entered. In some embodiments, the password unit 118 presents a graphical window in which a user can enter the secondary password. Because the BIOS can procure a secondary password after start-up operations are complete, it can avoid the delay of having to shut-down or restart a computer system. In some embodiments of the invention, a user can be given a limited number of opportunities to enter a secondary password before being locked out by the peripheral device. For example, an embodiment of the invention can have an attempt limit counter. After each failed secondary password entry, the attempt limit counter will be decremented until the limit counter equals a value. The flow continues at block 216.

At block 216, the password unit 118 receives the secondary password from a user. The flow continues at block 218.

At block 218, the device interface unit 116 transmits the secondary password to the peripheral device 102. From block 218, the flow ends.

Figure 3:
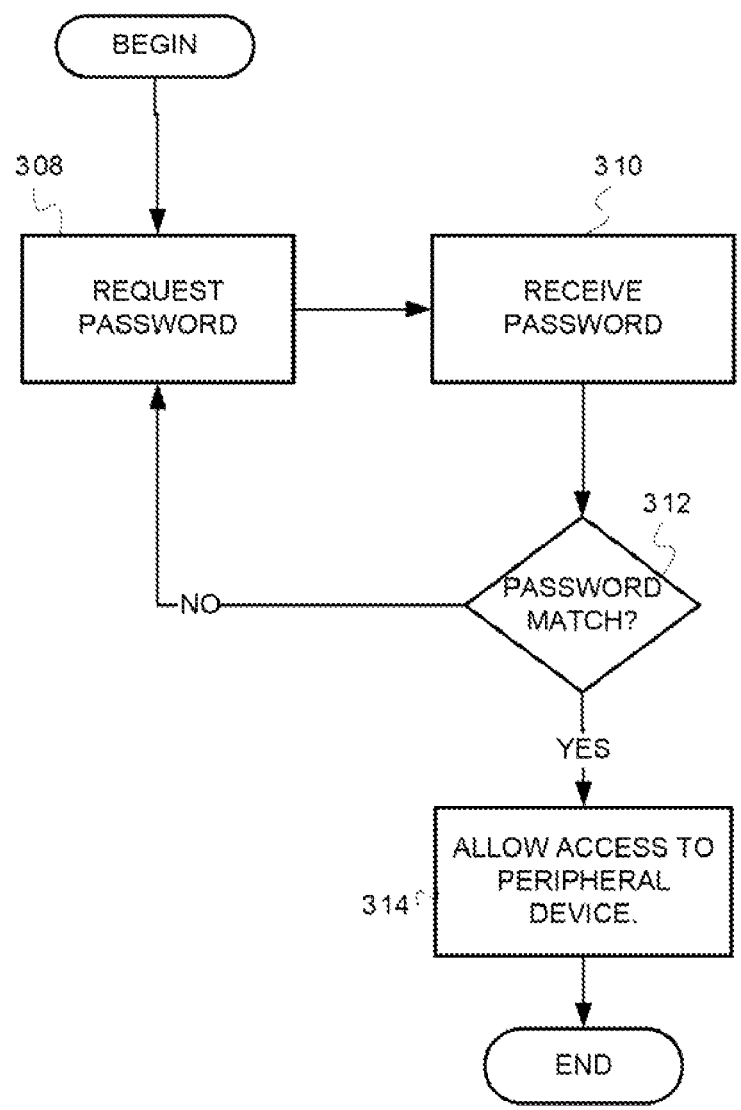
FIG. 3 is a flow diagram illustrating the operations of the peripheral device 102, according to some embodiments of the invention.

FIG. 3 is a flow diagram illustrating the operations of the peripheral device 102, according to some embodiments of the invention. In some embodiments of the invention, a user can disconnect an existing peripheral device that was present during the POST phase and replace it with a new peripheral device (e.g., hard drive, digital device, storage device, etc.). In other embodiments, a user can add a peripheral device that was not present at start-up. The operations of FIG. 3 cover either instance.

In FIG. 3, flow 300 begins at block 308, where the peripheral device's password request unit 104 requests a password from the BIOS 114 via the device interface unit 116 prior to allowing access to data on peripheral device 102. As noted above, the peripheral device 102 can be connected to the computer system 100 after power-on operations, so this operation can occur after the BIOS 114 has completed power-on operations. The flow continues at block 310.

At block 310, the password verification unit 106 receives a password. In some embodiments of the invention, the password that is initially received is the power-on password stored in the password store 126. Later, if the flow 300 loops back to 310, the password can be one that the BIOS acquired through a graphical user interface after power-on operations have completed. The flow continues at block 312.

At block 312, the password verification unit 104 determines if the received password matches the required access password. In some embodiments, the access password resides in the password verification unit 104. If the password verification unit 104 determines that the received password matches the access password for the peripheral device, the flow continues at block 314. If the password verification unit 104 determines that the received password does not match the access password for the peripheral device, the flow returns to block 308, where the password request unit 104 will again request a password from the BIOS 114. As described above, the BIOS 114 can procure another password through a user interface and provide the password to the peripheral device without restarting. Thus, the peripheral device 102 can receive the needed password without delays for shutting-down and restarting the computer system 100.

In some embodiments of the invention, the peripheral device limits the number of password attempts by locking itself after a number of failed password matches. For example, an embodiment of the invention can have an attempt limit counter. For each failed password entry, the attempt limit counter will be decremented until the limit counter equals a limit value. The steps previously noted will be repeated until the password verification unit 106 determines that the received password matches the access password for the peripheral device or until the limit counter equals the limit value.

The flow continues at block 314.

At block 314, the password verification unit 104 allows access to the peripheral devices data. For embodiments in which the peripheral device is not a storage device, the password verification unit 104 can allow access to device services (e.g., print, display, etc.). From block 314, the flow ends.

Other Embodiments

While the invention(s) is (are) described with reference to various implementations and exploitations, it will be understood that these embodiments are illustrative and that the scope of the invention(s) is not limited to them. In general, the techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the contest of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
   receiving a first password during power-on operations of a computer;
   comparing the first password to a power-on password stored in memory;
   loading an operating system to control the computer, wherein the loading occurs after the power-on operations;
   detecting, after the loading, that a peripheral device has been added to the computer;
   determining that a second password is needed to access the peripheral device;
   transmitting the power-on password to the peripheral device;
   presenting a prompt requesting the second password;
   receiving the second password;
   transmitting the second password to the peripheral device for authentication; and
   accessing the peripheral device, where the second password has been authenticated by the peripheral device.

2. The method of claim 1, further comprising comparing the second password to an access password stored in the peripheral device.

3. The method of claim 2 further comprising:
   granting access to the peripheral device if the second password matches the access password.

4. The method of claim 1, wherein the determining includes detecting a request for the second password from the peripheral device.

5. The method of claim 1, wherein the prompt includes a graphical user interface for receiving the second password through the graphical user interface.

6. The method of claim 1 further comprising:
   decrementing a limit counter that precludes receipt of the second password after the limit counter equals a limit value.

7. An computer system comprising:
   a basic input output system (BIOS) including,
      a power-on unit configured to perform power-on operations that initialize components of the computer system;
      a password store configured to store a power-on password;
      a device interface unit configured to detect a password request from a peripheral device and to transmit the power-on password to the peripheral device for authentication after the power-on operations are complete;
      a password unit configured to procure, after the power-on operations are complete, a second password for transmission to the peripheral device, wherein peripheral device includes,
         a password request unit configured to receive the power-on password and the second password; and
         a password verification unit configured to grant access to the peripheral device based on the power-on password and the second password.

8. The computer system of claim 7, wherein the password verification unit is further configured to compare the power-on password to an access password stored in the peripheral device and to compare the second password to the access password.

9. The computer system of claim 7, wherein the password unit is configured to procure the second password by presentation of a graphical user interface and receipt of the second password through the graphical user interface.

10. The computer system of claim 7, wherein the password unit is further configured to decrement a limit counter that precludes receipt of the second password after the limit counter reaches a limit value.

11. A machine-readable storage device including instructions that when executed by a machine cause the machine to perform operations comprising:
  receiving a first password during power-on operations of a computer;
  comparing the first password to a power-on password stored in memory;
  loading an operating system to control the computer, wherein the loading occurs after the power-on operations;
  detecting, after the loading, that a peripheral devices has been added to the computer;
  determining that a second password is needed to access the peripheral device;
  transmitting the power-on password to the peripheral device;
  presenting a prompt requesting the second password;
  receiving the second password;
  transmitting the second password to the peripheral device for authentication; and
  accessing the peripheral device, where the second password has been authenticated by the peripheral device.

12. The machine-readable storage device of claim 11, where the operations further comprise:
  comparing the second password to an access password stored in the peripheral device.

13. The machine-readable storage device of claim 12, where the operations further comprise:
  granting access to the peripheral device if the secondary password matches the access password.

14. The machine-readable storage device of claim 11, wherein the determining includes receiving a request for the second password from the peripheral device.

15. The machine-readable storage device of claim 11, wherein the prompt includes a graphical user interface for receiving the second password through the graphical user interface.

16. The machine-readable storage device of claim 11, where the operations further comprise:
  decrementing a limit counter that precludes receipt of the second password after the limit counter equals a limit value.

* * * * *